(12) United States Patent
Harrington

(10) Patent No.: US 8,904,272 B2
(45) Date of Patent: Dec. 2, 2014

(54) METHOD OF MULTI-DOCUMENT AGGREGATION AND PRESENTATION

(75) Inventor: Steven Harrington, Webster, NY (US)

(73) Assignee: Xerox Corporation, Norwalk, CT (US)

(*) Notice: Subject to any disclaimer, the term of this patent is extended or adjusted under 35 U.S.C. 154(b) by 881 days.

(21) Appl. No.: 12/774,415

(22) Filed: May 5, 2010

(65) Prior Publication Data

US 2011/0276866 A1 Nov. 10, 2011

(51) Int. Cl.
*G06F 3/14* (2006.01)
*G06F 17/00* (2006.01)
*G06F 17/30* (2006.01)

(52) U.S. Cl.
CPC .... G06F 17/30873 (2013.01); *G06F 17/30884* (2013.01)
USPC .............................. 715/209; 715/256; 715/838

(58) Field of Classification Search
CPC ...................... G06F 17/30873; G06F 17/30884
USPC .......................................... 715/209, 256, 838
See application file for complete search history.

(56) References Cited

U.S. PATENT DOCUMENTS

| | | | | |
|---|---|---|---|---|
| 5,371,744 A * | 12/1994 | Campbell et al. | | 709/238 |
| 5,706,503 A | 1/1998 | Poppen et al. | | |
| 5,873,081 A * | 2/1999 | Harel | | 1/1 |
| 6,505,190 B1 * | 1/2003 | Harel et al. | | 707/754 |
| 6,515,666 B1 | 2/2003 | Cohen | | |
| 7,096,420 B1 | 8/2006 | Peikes | | |
| 7,549,309 B2 | 6/2009 | Beringer et al. | | |
| 7,861,226 B1 * | 12/2010 | Episkopos et al. | | 717/124 |
| 2002/0156932 A1 * | 10/2002 | Schneiderman | | 709/317 |
| 2002/0188598 A1 * | 12/2002 | Myllymaki | | 707/2 |
| 2003/0145279 A1 * | 7/2003 | Bourbakis et al. | | 715/511 |
| 2007/0203693 A1 * | 8/2007 | Estes | | 704/9 |
| 2009/0024962 A1 * | 1/2009 | Gotz | | 715/838 |
| 2011/0029952 A1 * | 2/2011 | Harrington | | 717/123 |
| 2011/0131211 A1 * | 6/2011 | Harrington | | 707/741 |

OTHER PUBLICATIONS

M. Marszalek, C. Schmid, Semantic Hierarchies for Visual Object Recognition; INRIA, LEAR—LJK.
J.F. Roddick, P. Fule; SemGrAM—Integrating Semantic Graphs into Association Rule Mining; School of Informatics and Engineering, Flinders University.
M.R. Mayberry, III, M. W. Crocker; Generating Semantic Graphs Through Self-Organization; Saarland University.

(Continued)

*Primary Examiner* — Stephen Hong
*Assistant Examiner* — Marshon Robinson
(74) *Attorney, Agent, or Firm* — Kermit D. Lopez; Luis M. Ortiz; Ortiz & Lopez, PLLC

(57) ABSTRACT

Methods and systems for multi-document aggregation provide data representing a redundancy graph constructed from a document or document set and determine the longest acyclic path in the document redundancy graph. Nodes of the longest path are assigned to a column to be displayed. Each node is assigned to a corresponding position in the column according to the node position in the path. Methods and systems for ordering multi documents for presentation can determine the content of a node of the redundancy graph and order the content for display.

17 Claims, 10 Drawing Sheets

(56) References Cited

OTHER PUBLICATIONS

T.D.R. Harley, U. Catalyurek, F. Ozguner, A. Yoo, S. Kohn, K. Henderson, MSSG: A Framework for Massive-Scale Semantic Graphs; Dept. of Electrical and Computer Engneering and Dept. of Biomedical Informatics, , The Ohio State University, Center for Applied Scientific Computing, Lawrence Livermore National Laboratory.

J. Leskovee, N. Milic-Frayling, M. Grobelnik; Impact of Linguistic Analysis on the Semantic Graph Coverage and Learning of Document Extracts; Carnegie Mellon University, Microsoft Research Ltd., Jozef Stefan Institiute.

M.C. de Marneffe, T. Grenager, B. MacCartney, D. Cer, D. Ramage, C. Kiddon, C.D. Manning; Aligning Semantic Graphs for Textural Interence and Machine Reading, American Association for Artificial Intelligence.

C. Hirsch, J. Hosking, J. Grundy; Interactive Visualization Tools for Exploring the Semantic Graph of Large Knowledge Spaces; Department of Computer Science, The University of Auckland.

\* cited by examiner

FIG. 2

Skeletal Fluorosis

Note: The following article, while providing an insightful examination of skeletal fluorosis, contains a significant piece of outdated information. According to the article: "Most experts in skeletal fluorosis agree that ingestion of 20mg of fluoride a day for 20 years or more can cause crippling skeletal fluorosis." This view has changed however since the publication of this article.

In 1993, the national Research Council stated that crippling fluorosis may be caused by as little as 10 mg day of fluoride. To quote:

"Crippling skeletal fluorosis might occur in people who have ingested 10-20mg of fluoride per day for 10-20 years."

One solidly established concept in environmental health is that the effects of toxic agents fall on a continuum of biological change ranging from undetectable effects at the lowest In advanced skeletal fluorosis, called crippling skeletal fluorosis, the extremities become weak and moving the joints is difficult. The vertebra partially fuse together crippling the

[edit] Causes
Common causes of fluorosis include inhalation of fluoride dusts/fumes by workers in industry, use of coal as an indoor fuel source (a common practice in China), consumption of fluoride from drinking water (naturally occurring levels of fluoride in excess of the CDC recommended safe levels[1]), and consumption of fluoride from the drinking of tea,

[edit] Epidemiology
In some areas, skeletal fluorosis is endemic. While fluorosis is most severe and widespread in the two largest countries - India and China - UNICEF estimates that Endemic skeletal fluorosis is widely prevalent in India and in many countries around the world but it is a major public health problem in some 25 countries in Asia and Africa [Figure 1].[Figure 2]. [1] Sixty million Indians are living in about 200 districts of 20 states in

*FIG. 3*

METHOD OF MULTI-DOCUMENT AGGREGATION AND PRESENTATION

TECHNICAL FIELD

Embodiments are generally related to data-processing systems and methods. Embodiments also relate in general to the field of computers and similar technologies and, in particular, to software utilized in this field. In addition, embodiments relate to methods and systems for multi-document aggregation and presentation. Furthermore, embodiments relate methods and systems for multi-document access and management.

BACKGROUND OF THE INVENTION

With the advent of the Internet and the World Wide Web, a vast amount of digital information is available over such networks. Information search and retrieval systems are utilized with respect to such networks to locate documents with largely redundant information in response to queries entered by a user. If the retrieved information is not a part of the data that is commonly shared, the user may be forced to examine a multitude of documents and wade through common material in a search of an uncommon fact. Further, if the information sought is available in multiple documents, then the user may not be able to select the optimal suite for presenting the material.

In an effort to address such problems, portions of the information that is shared by various members of the document set can be first determined. Such information can be utilized to present a document navigation aid that removes the redundant information so that the user may visit a topic once and then select the presentation of a topic based on document properties. Typical information redundancy systems can eliminate such redundant information from the document(s). Information redundancy systems can objectively measure duplication, locate duplicate content, eliminate extraneous content, and harmonize text variations within the document sets. Such information redundancy approaches can generally locate documents stored in an electronic media in response to the query entered by the user and provide multiple entry paths.

There is a need to provide improved methods and systems for arranging and presenting multi-document information.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

According to one aspect, there is provided a method for multi-document aggregation. The method can comprise providing data representing a redundancy graph constructed from a document or document set; the redundancy graph having nodes containing document subcomponents of the document or document set; determining the longest acyclic path in the document redundancy graph; assigning nodes of the longest acyclic path to a column to be displayed; and assigning each node to a corresponding position in the column according to the node position in the path.

According to another aspect, there is provided a method for ordering multi documents for presentation. The method can comprise providing data representing a redundancy graph constructed from a document or document set; the redundancy graph having nodes containing document subcomponents of the document or document set; determining the content of a node of the redundancy graph; and ordering the content.

According to another aspect, there is provided a system for multi-document aggregation. The system can comprise a processor; a data bus coupled to the processor; and a computer usable medium embodying computer program code. The computer usable medium can be coupled to the data bus. The computer program code can comprise instructions executable by the processor and configured to: provide data representing a redundancy graph constructed from a document or document set; the redundancy graph having nodes containing document subcomponents of the document or document set. The computer program can be further configured to determine the longest acyclic path in the document redundancy graph. The computer program can be further configured to assign nodes of the longest acyclic path to a column to be displayed. The computer program can be yet further configured to assign each node to a corresponding position in the column according to the node position in the path.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2 illustrates a display image of columns of node paragraph information of the redundancy graph of FIG. 1 according to one example of an embodiment;

FIG. 3 illustrates a display image of columns of node paragraph information of the redundancy graph of FIG. 1 according to another example of an embodiment;

DETAILED DESCRIPTION

The particular values and configurations discussed in these non-limiting examples can be varied and are cited merely to illustrate at least one embodiment and are not intended to limit the scope thereof.

In today's digital document environment, it is easy for a user to be faced with a collection of documents about some topic. One example is the set of document references returned by a web search. The user may then be faced with examining the documents one after another to view their contents. A user can interact with the set as a whole by constructing a Document Redundancy Graph. The graph acts as a table of contents to the document set, allowing the user to see what topics are there, and to locate a particular topic and then to proceed to the document that contains it. The document redundancy graph is a navigation aid that enables the user to find information within the entire set. The graph collects information that is expressed redundantly within the set into a single node so that the user need not deal with the multiple copies. It also collects sequences of novel information into single nodes to simplify the graph.

Figure 1:
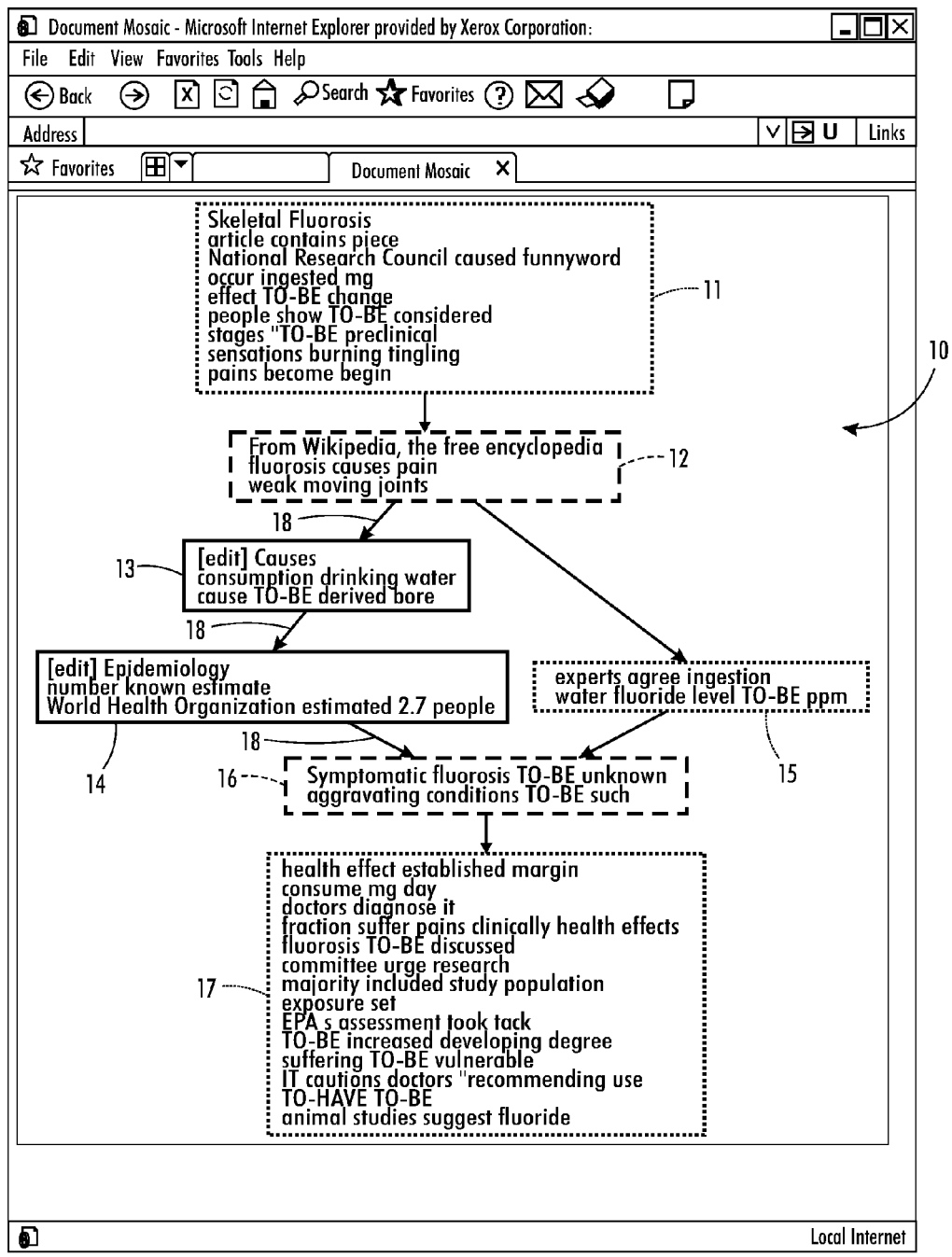
FIG. 1 illustrates a display image of an exemplary redundancy graph showing rendered navigation paragraph references.

FIG. 1 shows a simple graph that was generated for two documents on "skeletal fluorosis". In the figure, nodes 12,16 with bold dashed borders correspond to shared information. Nodes 13,14 with solid borders correspond to novel information for one document and nodes 15, 17 with fine dashed borders correspond to novel information for another document. Alternatively, the borders can be color coded by document.

While the graph can enable the user to find a particular piece of information, it may be that the user would like to capture and read all of the unique information within the document set. This is different from just listing all of the document contents, because the user does not want or need to see the redundant information repeated. The graph can help with this problem because it identifies the areas of redundancy so that a single example of the redundant information can be selected for presentation to the user. The graph is also useful in determining how to assemble the aggregate information since its edges indicate the original presentation orderings.

Technical features described in this application can be used to construct various embodiments of methods and systems for multi document aggregation from a document redundancy graph. As a general overview, an aggregate of the information in the document set can be constructed by first finding the longest path in the graph. For nodes along the path representing redundant information, a sample of the information can be chosen, while for nodes corresponding to novel information, the novel information is presented. Additional paths are identified by finding the longest paths among any remaining nodes. These additional paths are aligned with one another and presented in columns. When samples from redundant information are selected, the user can specify selection criteria.

Note that redundancy can be determined at a paragraph level or some other document subcomponent level depending on the desired granularity of the documents. For example, the methods and/or systems for multi-document aggregation of the embodiments disclosed herein can be utilized to aggregate multi-document information in a redundancy graph in which redundancy has been determined at a finer level than the paragraph level, such as sentences or phrases, or alternatively at coarser level such as sections or documents.

The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method may be practiced with other computer system configurations, including hand-held devices, multi-processor systems, microprocessor-based or programmable consumer electronics, networked PCs, minicomputers, mainframe computers, and the like.

Figure 8:
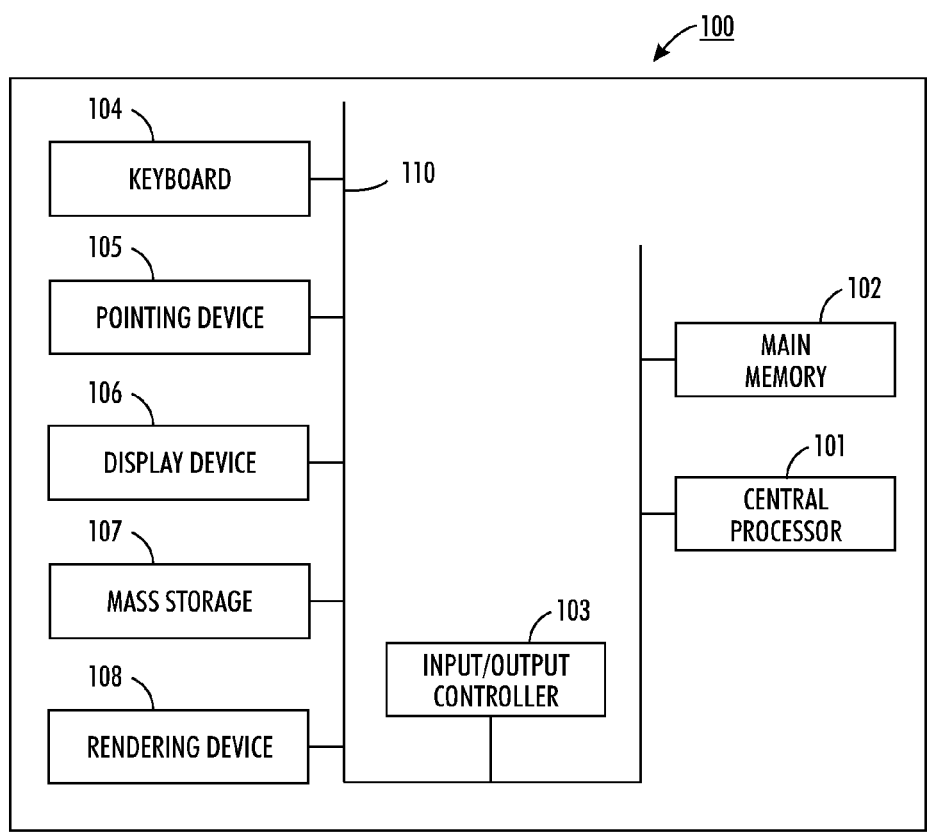
FIG. 8 illustrates a schematic view of a computer system in which the present invention may be embodied.

As depicted in FIG. 8, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. As illustrated, the various components of the data-processing apparatus 100 communicate through a system bus 110 or similar architecture. It can be appreciated that the data-processing apparatus 100 may be in some embodiments a mobile computing device such as a Smartphone, a laptop computer, iPhone, etc. In other embodiments, data-processing apparatus 100 may function as a desktop computer, server, and the like, depending upon design considerations.

Figure 9:
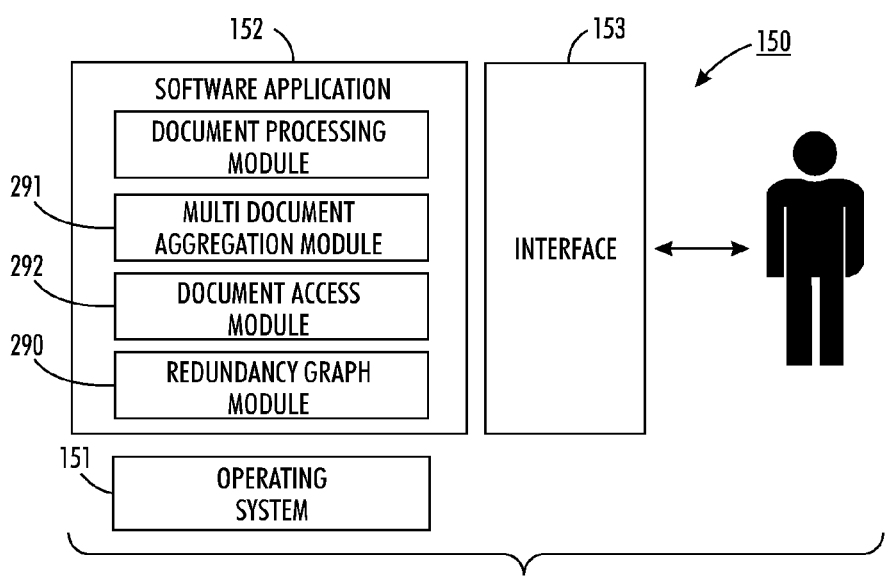
FIG. 9 illustrates a schematic view of a software system including an operating system, application software, and a user interface for carrying out the present invention.

FIG. 9 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term "module" may also simply refer to an application such as a computer program design to assist in the performance of a specific task such as word processing, accounting, inventory management, etc.

The interface 153, which is preferably a graphical user interface (GUI), also serves to display results, whereupon the user may supply additional inputs or, for example, terminate a given session. In one embodiment, operating system 151 and interface 153 can be implemented in the context of a "Windows" system. It can be appreciated, of course, that other types of systems are possible. For example, rather than a traditional "Windows" system, other operating systems such as, for example, Linux may be employed with respect to operating system 151 and interface 153 in another embodiment. Application module 152, on the other hand, can include instructions such as the various operations described herein such as, for example, the methods depicted in FIG. 6 and FIG. 7. More specifically, in one example, the document processing module 152 can include a module 290 for constructing a document redundancy graph. Module 290 can be adapted for collapsing redundant nodes and unique node sequence with respect to the document set. Processing module 152 also includes multi-document aggregation module 291 for executing the methods for multi-document aggregation according to the embodiments. Furthermore, processing module 152 includes document access module 292 for executing the methods for multi-document presentation ordering according to the embodiments.

Figure 10:
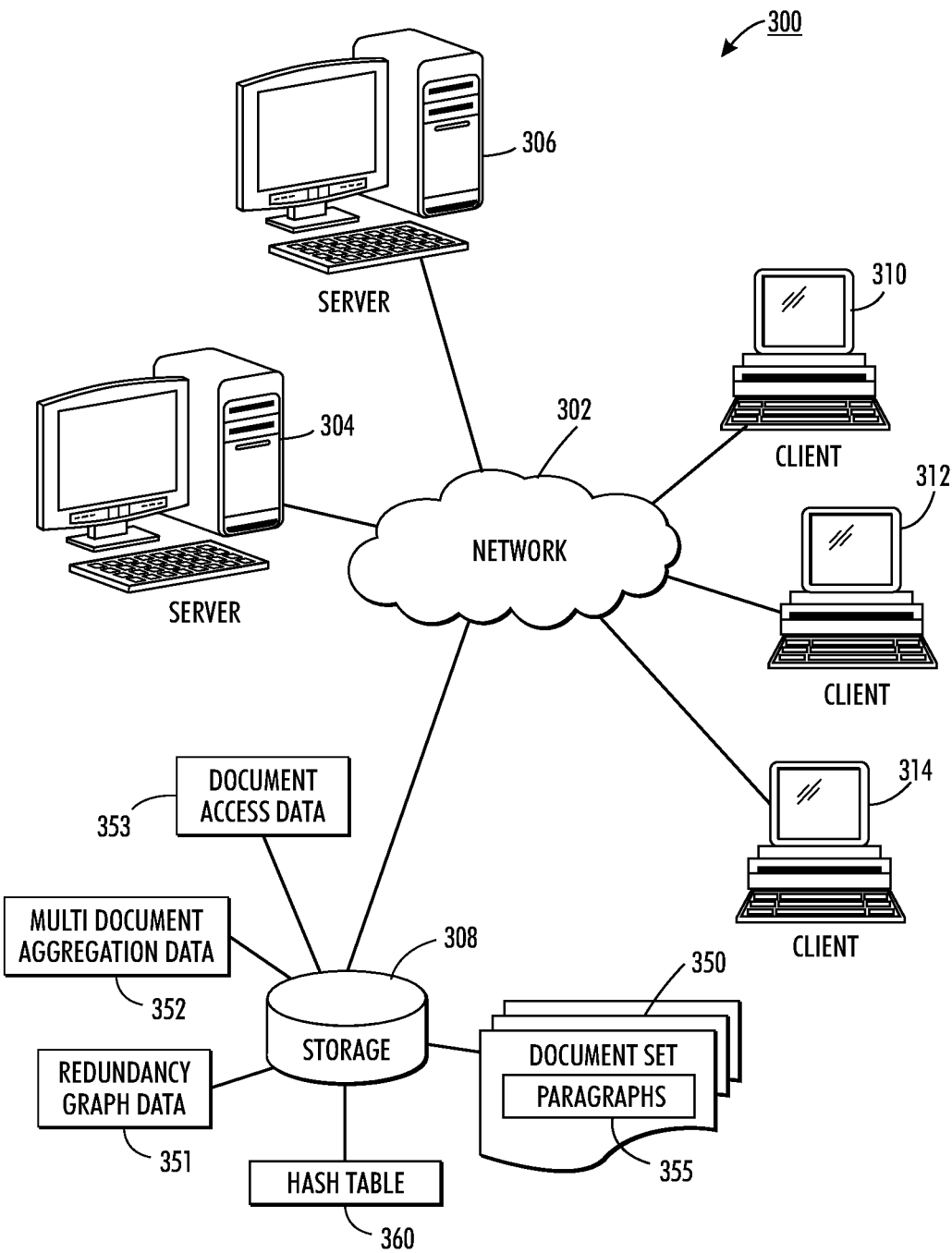
FIG. 10 illustrates a graphical representation of a network of data processing systems in which aspects of the present invention may be implemented.

FIG. 10 illustrates a graphical representation of a network of data processing systems in which aspects of the present invention may be implemented. Network data processing system 300 is a network of computers in which embodiments of the present invention may be implemented. Network data processing system 300 contains network 302, which is the medium used to provide communication links between various devices and computers connected together within network data processing system 100. Network 302 may include connections such as wire, wireless communication links, or fiber optic cables.

In the depicted example, servers 304 and 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations. In the depicted example, server 304 provides data such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content. It should be appreciated that the computational tasks described herein may be carried out on multiple servers that communicate their data and results over a network 302. It should also be appreciated that the clients 310, 312 and/or 314 may provide an interface to the user for collecting input and presenting results and can additionally communicate tasks to the servers 304 and/or 306 over the network 302.

A document set 350 stored in the database 308 can be accessed by the end-user work stations 310, 312 and 314 in order to retrieve information related to a topic of interest. The document set 350 can be stored in an electronic form in the database 308, can include graphic or other information displays derived from separate computer programs and exported into a computer word processor program, and stored as a single computer file in word processor format. The document set 350 may also be distributed over multiple storage locations and is accessible via a network (e.g., web pages accessible via the Internet and World Wide Web). The database 308 may store information regarding the documents of the document set in addition to, or instead of, storing the documents themselves. Many documents are functionally linked to other documents that deal with a particular business or academic function and can be referred to as document sets. The document set 350 can include a number of paragraphs 355 associated with redundancy information. Redundancy graph data 351 representing a redundancy graph constructed from the document set 350 can also be stored in database 308. Furthermore, multi-document aggregation data 352 representing preference criteria data and other multi-document aggregation data can also be stored in database 308. Yet, furthermore, document access data 353 representing preference ordering criteria and other document access and management data can also be stored in database 308.

In the depicted example, network data processing system 300 is the Internet with network 302 representing a world-wide collection of networks and gateways that use the Transmission Control Protocol/Internet Protocol (TCP/IP) suite of protocols to communicate with one another. At the heart of the Internet is a backbone of high-speed data communication lines between major nodes, or host computers, consisting of thousands of commercial, government, educational, and other computer systems that route data and messages. Of course, network data processing system 300 also may be implemented as a number of different types of networks such as, for example, an intranet, a local area network (LAN), or a wide area network (WAN). FIG. 10 is intended as an example and not as an architectural limitation for different embodiments of the present invention.

FIGS. 8-10 are provided as exemplary diagrams of data processing environments in which embodiments of the present invention may be implemented. It should be appreciated that FIGS. 8-10 are only exemplary and are not intended to assert or imply any limitation with regard to the environments in which aspects or embodiments of the present invention may be implemented. Many modifications to the depicted environments may be made without departing from the spirit and scope of the present invention. Note that in FIGS. 1-11, identical or similar parts are generally indicated by identical reference numerals.

The following description is presented with respect to embodiments of the present invention, which can be embodied in the context of a data-processing system such as data-processing system 100 and computer software system 150 depicted respectively in FIGS. 8-9. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

By way of example, U.S. patent application Ser. No. 12/533,901, entitled "Methods and System for Constructing a Document Redundancy Graph", to Steven Harrington, filed on Jul. 31, 2009, the disclosure of which is incorporated herein by reference in its entirety, discloses methods and systems for constructing a document redundancy graph. As will be explained more fully below, U.S. patent application Ser. No. 12/533,901 discloses systems and methods, which can be utilized for constructing a document redundancy graph with respect to a document set, such that each node in the graph represents a unique cluster of information. The methodology includes techniques for analyzing the document paragraphs as well as a set of similarity criteria utilized to detect redundant paragraphs.

In particular, the method of constructing a document redundancy graph comprises: representing at least one paragraph associated with a document set as a node among a plurality of nodes, wherein each node among the plurality of nodes with respect to the redundancy graph represents a unique cluster of information; merging the plurality of nodes associated with redundant information by configuring a data structure with respect to a pair of information identifiers in association with a probability value, wherein the probability value sorts a plurality of information matches in an order of decreasing certainty; and combining the plurality of nodes unique to a single document by comparing each information identifier among the pair of information identifiers to an entry in the data structure in an order wherein the data structure eliminates inconsistency associated with the plurality of information matches.

Figure 11:
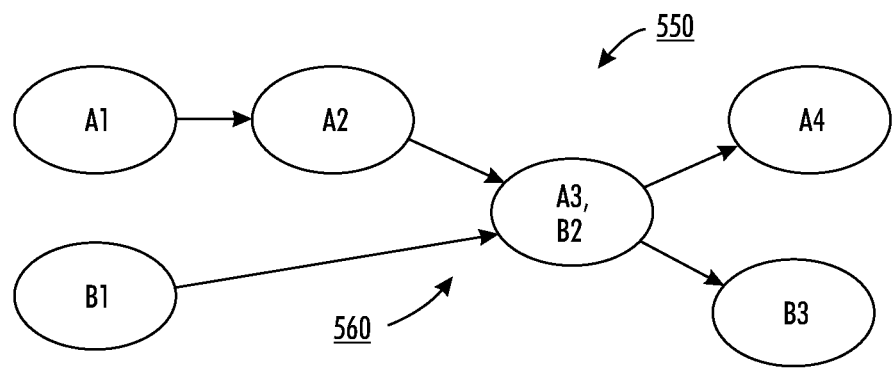
FIG. 11 illustrates a graphical representation illustrating an example of merged nodes with redundant information.

The document redundancy graph can be constructed by collecting paragraphs in the document set that provide similar information into nodes, thereby identifying and removing the redundancy. Also, sequences of paragraph of information unique to a document can be grouped into nodes for a more compact representation. By way of example, FIG. 11 illustrates a graphical representation illustrating a document 550 as a series of paragraph nodes. The paragraph associated with the document 550 can be represented as a series of paragraph nodes such as paragraph nodes A1, A2, A3, and A4. Each node can include a unique cluster of information related to the paragraph associated with the document 550. The nodes A1, A2, A3, and A4 can be linked to each other based on sequence of paragraph list in the document 550.

Paragraphs of multiple documents can be analyzed and nodes with redundant information can be combined into a single node. Sequences of unique paragraphs can be collected to form chain nodes. More detailed methods and systems for forming combined nodes and chain nodes are disclosed in U.S. patent application Ser. No. 12/533,901.

Figure 6:
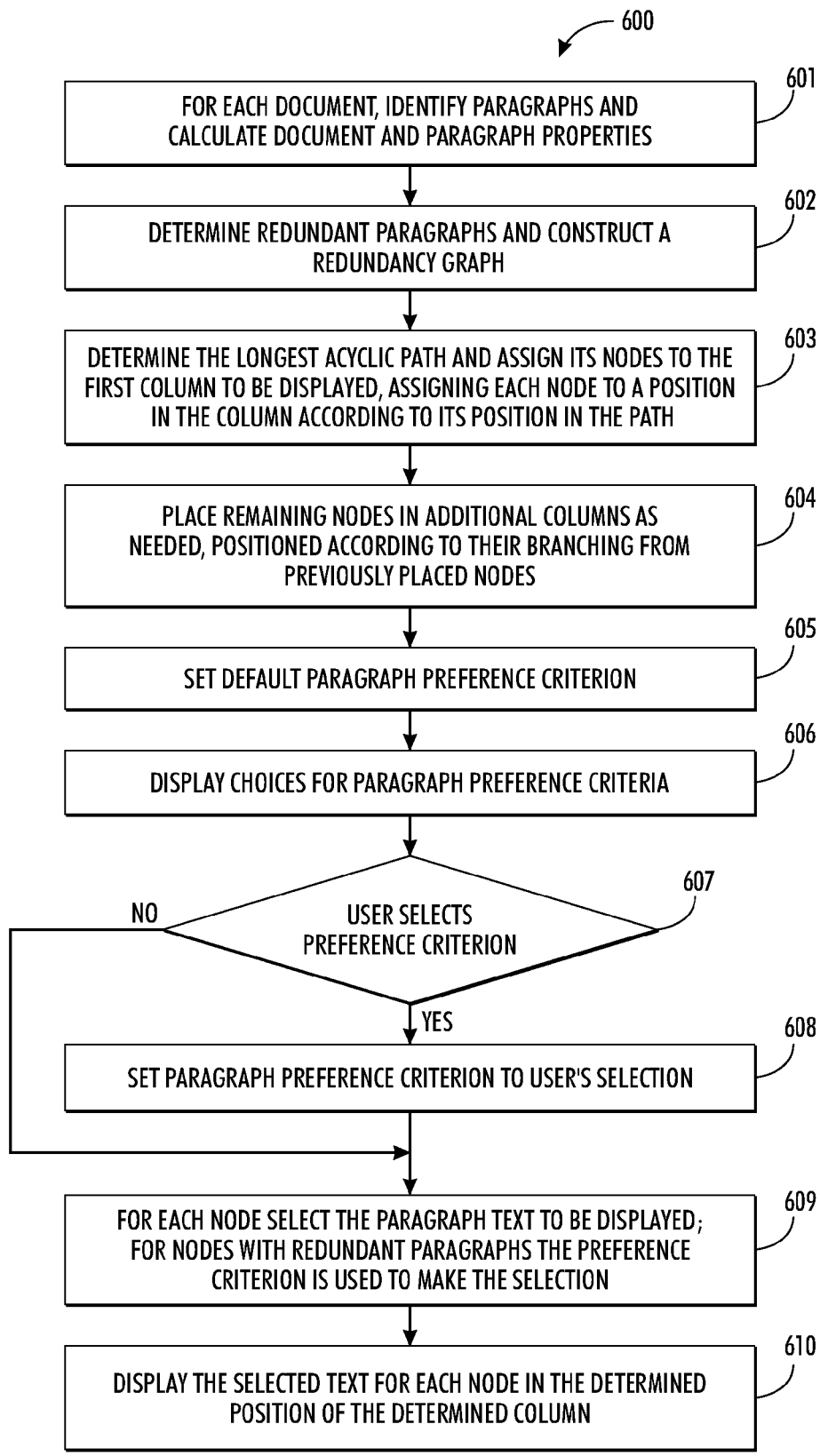
FIG. 6 illustrates a flow chart of a process for multi-document aggregation according to an embodiment.

FIG. 6 generally illustrates a method for multi document aggregation according to one embodiment. Method of FIG. 6 can be, for example, implemented in the system of FIGS. 8 to 10. Method of FIG. 6 can be implemented for aggregating multi-documents of any redundancy graph.

For each document, paragraphs are identified and document and paragraph properties calculated (601). Redundant paragraphs are determined and a redundancy graph constructed (602). Alternatively, the document redundancy graph can be pre-constructed and provided to the system. The longest path in the redundancy graph is then determined (603). Since conventional documents present information in a linear order, a linear sequence of some of the content can then be identified. This corresponds to a path through the graph where the content from each node in the path is presented in path order. To handle as much of the content as possible in this way, the longest possible acyclic path in the graph is sought.

Nodes in the longest path are assigned to a first column to be displayed (603). Each of these nodes is assigned to a position in the column according to its position in the path (603). By way of example, nodes 11-14 of the redundancy graph of FIG. 1 are assigned to respective positions in first column 20 of FIG. 2. Remaining nodes are placed in additional columns 21 as needed, positioned according to their branching from previously placed nodes (604) as described below.

Figure 2:
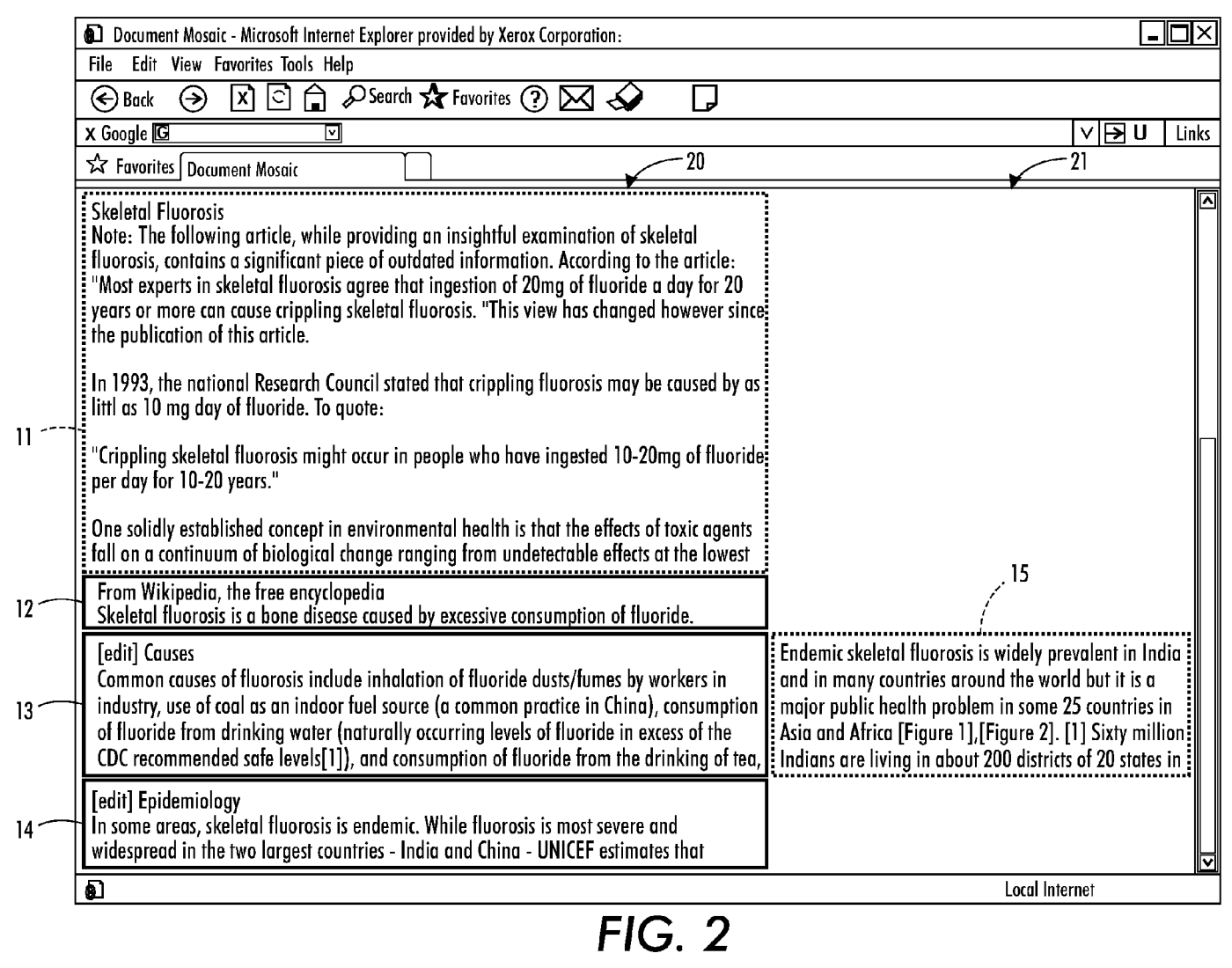

While the longest path may include many if not most of the nodes it need not include all of the nodes of the graph. This raises the issue of how best to present this additional information. By way of example, in FIG. 1, there is depicted a branching of the information, and taking the left branch will include two nodes 13, 14, forming a longer path 18 than the right branch with only a single node 15. There is still the need to present the node in the right branch. If node 15 placed in the right branch is presented at the beginning or end of the sequence, it will be out of sequence, but if the node is merged into the middle of the original path, it disrupts that sequence. A solution is to not merge it at all, but rather to create an additional column of text in which the node can be placed. The node is given the vertical placement that corresponds to its branching from the original path (which is presented in the leftmost column). This is illustrated in FIG. 2, which presents the start of the columns 20, 21 for the skeletal fluorosis example of FIG. 1. The content can be optionally presented with solid colored backgrounds that correspond to the source documents (and that can match the node colors (not shown)). If there were multiple nodes left off of the original longest path, then we would find the longest paths among them and align these paths to the original longest path and each other. So long as the placement of these additional paths does not result in overlap, their content can be entered into the second column 21. Additional columns can be used when higher degrees of overlap occur.

Default paragraph preference criterion is then set (605). Choices for paragraph preference criteria are displayed (606). By way of example, in FIG. 1, the second node of the presented longest path is a redundancy node 12, and that content from one of the documents must be selected to represent this node. In FIG. 2, this content was taken from the document associated with nodes 13 and 14; however, various criteria might be used in making the decision that could lead to an alternative selection. Criteria can be based on document and/or paragraph properties such as length, readability, degree of novelty and so on.

User selects preference criterion (607). Paragraph preference criterion is set to user's selection (608). For each node the paragraph text to be displayed is selected (609). For nodes with redundant paragraphs the preference criterion is used to make the selection (609). Display the selected text for each node in the determined position of the determined column (610). Thus, process 600 can provide the user with a choice of supported criteria and construct the aggregate content in accordance with their choice. In FIG. 3, the user has picked the longest content as the criterion for selection, and this leads to the second node 12 entry coming from the document associated with nodes 11 and 15.

When a set of documents is listed for a user, the order of the presentation is often controlled by the document selection and presentation system. For example, when a web search returns a list of matching documents, the order of those documents is governed by the search engine, and is typically the order that the search engine judges to be most likely to provide the most useful matches first. However, the user may have different priorities and would prefer a different ordering. For example, the user might want the documents with the most information, or the documents that are easiest to read, or the documents that include images, or simply an alphabetical list for cataloging.

One can provide the user with options for alternative listing orders if the properties used for sorting the documents are available. Such properties might have been pre-computed and stored as metadata with the documents, or it might be computed as needed. To compute document properties, one may need to retrieve the document if it is not already available (for example, retrieving some number of documents referenced by a web search). The document content is then processed to calculate the needed property (for example, examining the text of the document to calculate a readability measure). Once a property (such as readability) has been calculated for each document on the list, the documents can be ordered and presented according to their readability, allowing the user to select and view the most readable ones.

As already mentioned hereinbefore, in U.S. patent application Ser. No. 12/533,901 a method for using this paragraph matching information to construct a graph that collects shared and novel content into separate nodes (a document redundancy graph) is described. This graph serves as a generalization of a table of contents to a set of documents. Each node corresponds to a topic or point of information. The graph can be designed such that when a user clicks on a given node, the system will present the user with all of the paragraphs about that topic from all of the documents in the set.

A method for ordering multi documents for presentation can be provided according to one embodiment in which data representing a redundancy graph constructed from a document or document set is provided by the system. The redundancy graph has nodes containing document subcomponents of the document or document set. Content of a node of the redundancy graph is determined by the system and then ordered. The ordered content can then be rendered on the user interface display. Part of the ordered content, such as the first member of the ordered content (e.g. first paragraph), can be selected and rendered on the display.

Methods of multi document presentation ordering can be implemented in the multi-document aggregation methods to provide the user with a choice of possible orderings. Multi document presentation ordering methods of the embodiments allow the user to select different ordering criteria for the presentation of documents and document components. Content properties such as readability, length, relevance or image inclusion, for example, might be used to order the list to aid the user in selection of an item for viewing.

Figure 7:
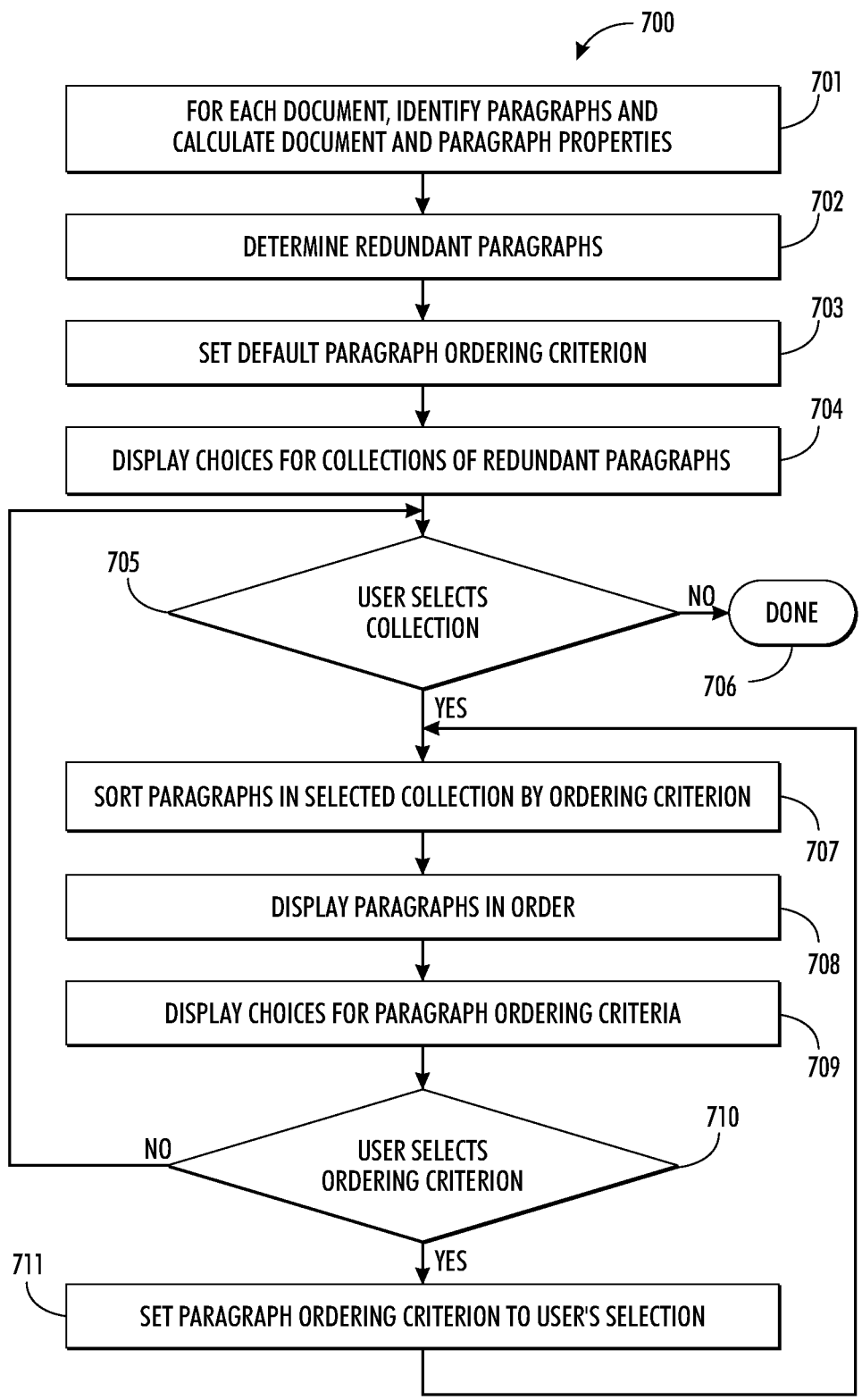
FIG. 7 illustrates a flow chart of a process for ordering document subcomponents for presentation according to an embodiment.

FIG. 7 illustrates a method 700 for ordering multi documents for presentation according to one embodiment. For each document, paragraphs are identified and document and paragraph properties are calculated (701). Redundant paragraphs are then determined from the identified paragraphs (702). Default paragraph ordering criterion is set (703). Choices for collections of redundant paragraphs are rendered on a display (704). User then selects a collection (705). If no selection is made, process is complete (706). Paragraphs in selected collection are sorted by ordering criterion (707). Paragraphs are displayed in order (708). Choices for paragraph ordering criteria are displayed (709). If user selects ordering criterion (710), paragraph ordering criterion is set to user's selection (711). Otherwise, the process reverts and waits for the user to select a collection of redundant paragraphs.

When a user selects a node of the document redundancy graph, a list of paragraphs is returned. This list not only provides access to the paragraph text, but also to metadata about the paragraph, including the document to which it belongs and further metadata about the document. This content and metadata can be used to calculate orderings. For example if the length of the paragraph text is available (either as metadata or as calculated from the text itself), then the paragraphs can be ordered by length. Readability values, such as the well known measures based on average sentence length and average syllables per word, can be calculated (either when needed or as metadata) and can be used to sort the paragraphs according to their readability. If the user is interested in a particular topic and that topic can be characterized by a set of words, then the density of these words in a paragraph can be calculated and used for ordering according to topic relevancy. Note that properties of the parent documents can be used to order the paragraphs as well as properties of the individual paragraphs. This might be done if the user intends to view more of the whole document, and the selected paragraph just serves as a starting point. Thus one might order the paragraphs according to the most readable documents, regardless of readability of the individual paragraphs. Or one might order the paragraphs according to the density of images within the parent documents.

Figure 4:
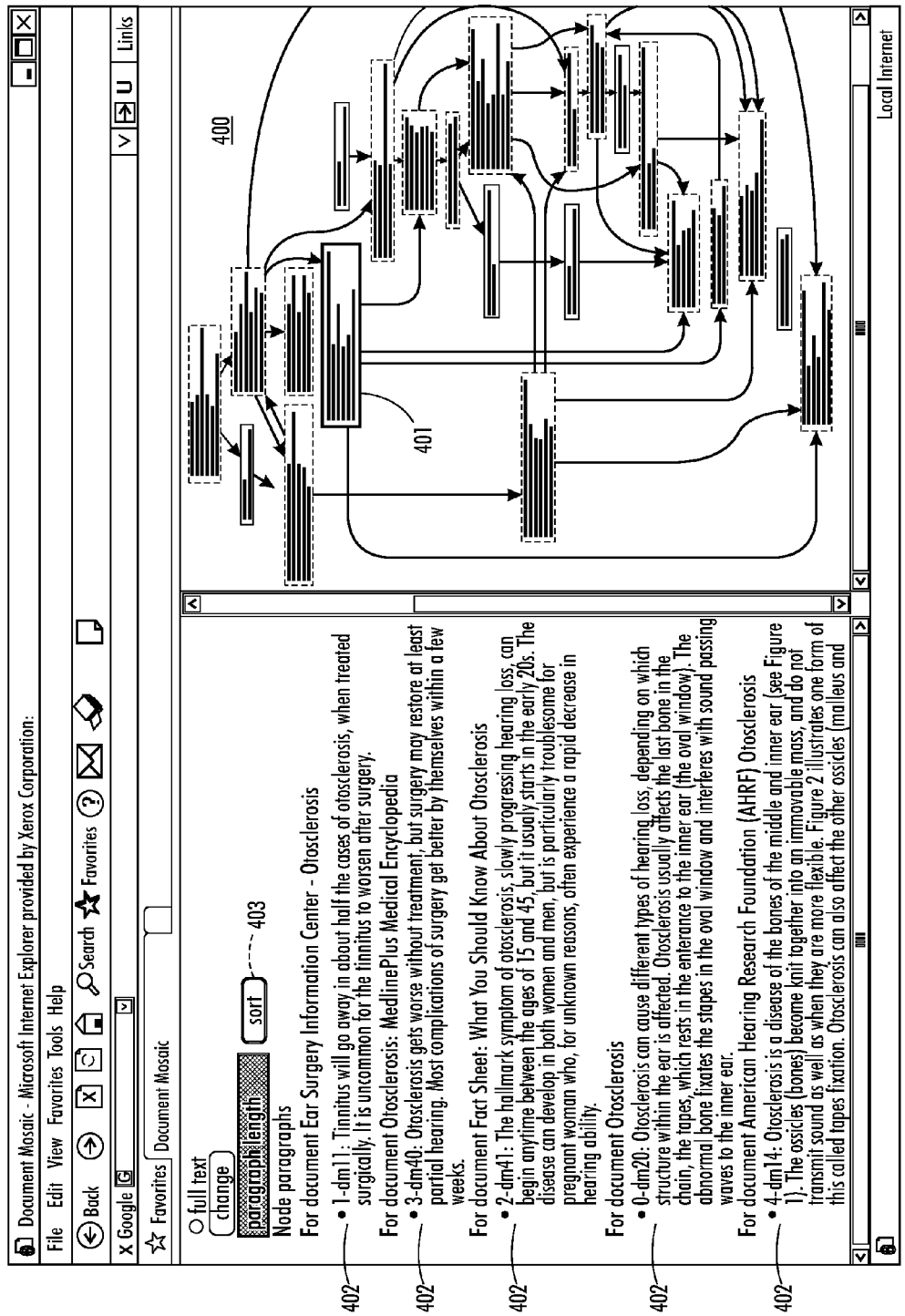
FIG. 4 illustrates a display image of a redundancy graph and sorted paragraphs of a selected node according to one embodiment.
Figure 5:
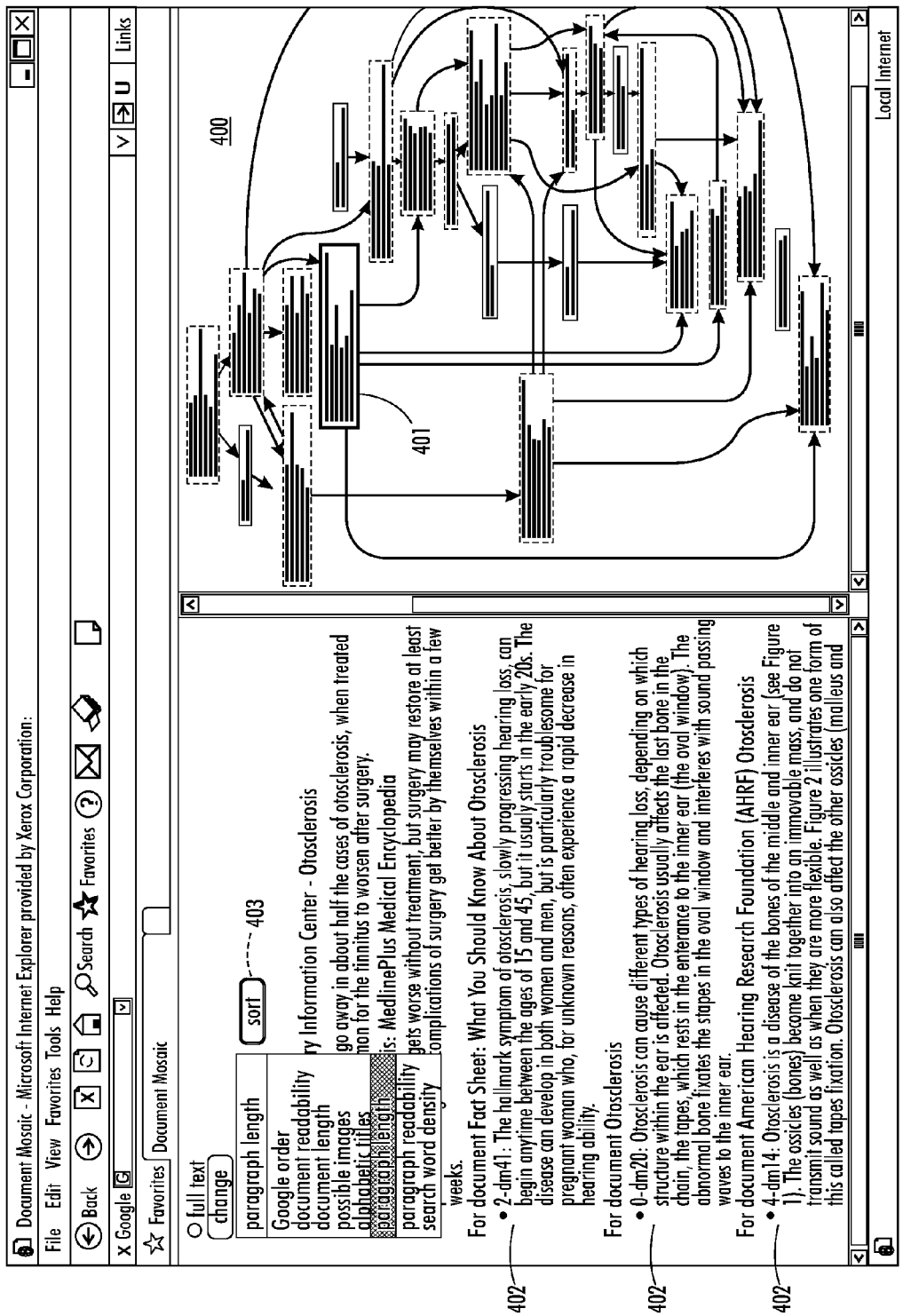
FIG. 5 illustrates a display image similar to the display image of FIG. 4 but showing the sorting options menu according to one embodiment.

FIG. 4 is a screen shot showing a document redundancy graph 400 and the set of paragraphs 402 associated with a selected node 401 of the graph. Paragraphs 402 are listed in order of their lengths. This was accomplished by means of the sorting menu and button 403 shown in the user interface. FIG. 5 shows the menu of sorting choices available.

By way of example, a method for ordering multi-documents for presentation can be implemented in the method for multi-document aggregation of FIG. 6. For nodes with redundant paragraphs the method for ordering multi-documents for presentation can be utilized to sort redundant paragraphs according to a specific criteria selected by the user eg. paragraph length. Method 600 then selects the paragraph text based on the selection (609).

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for multi-document aggregation, said method comprising:
   constructing a document redundancy graph from a document set, said document redundancy graph comprising a plurality of nodes wherein each node of said plurality of nodes represents a unique cluster of information and wherein said plurality of nodes comprise at least one redundant node comprising duplicate clusters of information extracted from a plurality of documents of said document set;
   determining a longest acyclic path in said document redundancy graph;
   displaying each node of said plurality of nodes of said longest acyclic path in a first column of a plurality of columns on a graphical user interface;
   displaying said each node in a position in said first column corresponding to a position in said longest acyclic path;
   displaying at least one node of a branching path in said document redundancy graph in an additional column of said plurality of columns in a position corresponding to a position in said document redundancy graph where said at least one node of said branching path branched from said longest acyclic path of said document redundancy graph on said graphical user interface;
   providing preference criteria for selecting from said redundant node at least one particular cluster of information;
   rendering on said graphical user interface said preference criteria;
   selecting at least one particular document from said at least one redundant node in accordance with a user selection of said preference criterion; and
   selecting said particular cluster of information from said selected at least one particular document for display.

2. The method of claim 1, wherein said at least one node is displayed in said additional column so as to align with the branching from said longest acyclic path in said document redundancy graph displayed in said first column.

3. The method of claim 1, further comprising:
   displaying for each node of said plurality of nodes, at least a portion of said unique cluster of information represented by said each node.

4. The method of claim 3, further comprising
   selecting said unique cluster of information for said each node; and
   displaying said unique cluster of information at a corresponding column position for said each node.

5. The method of claim 1, further comprising:
displaying on said graphical user interface at said corresponding position said particular cluster of information of said at least one redundant node.

6. The method of claim 5, further comprising:
determining a plurality of collections of document clusters of information of said at least one redundant node;
rendering choices of said a plurality of collections on said graphical user interface;
selecting a collection among said collections of document clusters of information; and
sorting said document clusters of information in said selected collection according to ordering criterion.

7. The method of claim 6, further comprising:
for each node of said at least one redundant node, selecting a particular sorted document cluster of information;
rendering said particular sorted document cluster of information in a column of said plurality of columns at a position of said at least one redundant node containing said particular sorted document cluster of information.

8. The method of claim 1, wherein each unique cluster of information of said each node of said plurality of nodes comprises a paragraph.

9. The method of claim 3, wherein each unique cluster of information of said each node of said plurality of nodes comprises a paragraph.

10. The method of claim 4, wherein each unique cluster of information of said each node of said plurality of nodes comprises a paragraph.

11. The method of claim 7, wherein each unique cluster of information of said each node of said plurality of nodes comprises a paragraph.

12. A method for ordering multi documents for presentation, said method comprising:
constructing a document a redundancy graph constructed from a document set, said document redundancy graph comprising a plurality of nodes wherein each node of said plurality of nodes represents a unique cluster of information and wherein said plurality of nodes comprise at least one redundant node comprising duplicate clusters of information extracted from a plurality of documents of said document set;
displaying the text of each node of said plurality of nodes of a first document of said document set in a first column of a plurality of columns on a graphical user interface in a position corresponding to a position in said document redundancy graph and displaying at least one node of a branching path from a second document of said document set in said document redundancy graph in a second column of said graphical user interface in a position corresponding to a position in said document redundancy graph wherein said branching path branched a longest acyclic path;
determining the content of said each node and said at least one node of said branching path of said redundancy graph; and
ordering said content.

13. The method of claim 12, further comprising:
rendering said ordered content on said graphical user interface.

14. The method of claim 13, further comprising:
selecting part of said ordered content; and
rendering said selected part of said ordered content on said graphical user interface.

15. A system for multi-document aggregation, said system comprising:
a processor;
a data bus coupled to said processor; and
a computer usable medium embodying computer program code, said computer usable medium being coupled to said data bus; and said computer program code comprising instructions executable by said processor and configured to:
constructing a document redundancy graph from a document set, said document redundancy graph comprising a plurality of nodes wherein each node of said plurality of nodes represents a unique cluster of information and wherein said plurality of nodes comprise at least one redundant node comprising duplicate clusters of information extracted from a plurality of documents of said document set;
determine a longest acyclic path in said document redundancy graph;
displaying each node of said plurality of nodes of said longest acyclic path in a first column of a plurality of columns on a graphical user interface;
displaying said each node in a position in said first column corresponding to a position in said longest acyclic path;
displaying at least one node of a branching path in said document redundancy graph in an additional column of said plurality of columns in a position corresponding to a position in said document redundancy graph where said at least one node of said branching path branched from said longest acyclic path of said document redundancy graph on said graphical user interface;
providing preference criteria for selecting from said redundant node at least one particular cluster of information;
rendering on said graphical user interface said preference criteria;
selecting at least one particular document from said at least one redundant node in accordance with a user selection of said preference criterion; and
selecting said particular cluster of information from said selected at least one particular document for display.

16. The system of claim 15, further comprising a user interface operably coupled to said processor; and wherein said computer program code is further configured to:
displaying for each node of said plurality of nodes a portion of a unique cluster of information represented by said each node in said first or said additional column.

17. The system of claim 16, and wherein said computer program code is configured to:
select said unique cluster of information for said each node; and
display said unique cluster of information at a corresponding column position.

* * * * *